United States Patent [19]

Cavallo

[11] 4,202,919
[45] May 13, 1980

[54] PROCESS FOR MANUFACTURING PROTEIN-CONTAINING ARTIFICIAL LEATHER

[75] Inventor: Margherita Cavallo, Monfalcone, Italy

[73] Assignee: Establissement Chemiaro, Mauren, Liechtenstein

[21] Appl. No.: 902,368

[22] Filed: May 3, 1978

Related U.S. Application Data

[63] Continuation of Ser. No. 768,870, Feb. 15, 1977, abandoned.

[30] Foreign Application Priority Data

Feb. 20, 1976 [CH] Switzerland .......................... 2139/76

[51] Int. Cl.$^2$ .......................... B05D 5/00; B05D 3/02; B32B 27/40
[52] U.S. Cl. ..................................... 427/245; 8/127.5; 427/338; 427/389; 427/401; 427/407.1; 428/423.5; 428/473; 428/904
[58] Field of Search .................. 8/127.5; 427/338, 389, 427/390 R, 394, 245, 407 R, 401; 428/2, 289, 425, 474, 904, 473

[56] References Cited

U.S. PATENT DOCUMENTS

| | | | |
|---|---|---|---|
| 2,374,201 | 4/1945 | Highberger et al. | 8/127.5 |
| 3,223,551 | 12/1965 | Tu | 427/389 |

FOREIGN PATENT DOCUMENTS 1367490  9/1974  United Kingdom .................... 427/389

*Primary Examiner*—Michael R. Lusignan
*Attorney, Agent, or Firm*—Stevens, Davis, Miller & Mosher

[57] ABSTRACT

This invention relates to an improved process for manufacturing artificial tanned hides possessing characteristics very similar to those of natural tanned hides. This process comprises the steps of: preparing a colloidal solution of a protein substance of collagenic origin by dissolving untanned flesh and/or slaughterhouse waste in hot water; deeply soaking a synthetic support of good porosity, and of known type, with said solution of collagenic substance, and condensing and cross-linking said collagenic substance on the synthetic support fibres by the simple action of cross-linking agents; and tanning the support thus soaked by using the known tanning processes of natural hide tanning technology.

12 Claims, No Drawings

PROCESS FOR MANUFACTURING PROTEIN-CONTAINING ARTIFICIAL LEATHER

This is a continuation of application Ser. No. 768,870 filed Feb. 15, 1977 now abondoned.

BACKGROUND OF THE INVENTION

1. Field of the Invention

This invention relates to an improved process for manufacturing artificial tanned hides possessing characteristics very similar to those of natural tanned hides.

Various processes, some of long standing, are known for manufacturing artificial leather. These processes may be divided into two large categories:
  processes which use only synthetic materials,
  processes which also use natural products, such as scrap pieces of natural tanned hides or leather, the process according to the invention being more closely related to these processes.

The processes of the latter type have been subjected to much study and improvement, with the common object of achieving characteristics for the obtained product which approach the characteristics of natural hides.

2. Description of the Prior Art

The main method used in the past has been to finely triturate leather offcuts or tanned waste pieces from tanneries, and then mix this triturated material with natural or synthetic binders to form a semidense mix. This mix is then formed into a layer which, after pressing and drying, forms the required artificial leather.

In order to improve the mechanical characteristics of the products obtained by these processes, namely resistance to tear on the one hand and softness and other comfort-linked characteristics on the other hand, processes have been more recently proposed (see for example French Pat. No. 1,348,716 and U.S. Pat. Nos. 3,223,551, 3,285,775, 3,345,201) according to which a mass of finely ground leather fibres kept in non-colloidal aqueous suspension is applied to synthetic fibre supports, making the individual leather fibres separately penetrate into the support by mechanical and chemical means, and fixing the fibres on to the synthetic fibres of the support, preferably using binders based for example on dissolved nylon.

The process is very complex (both from the mechanical and from the chemical-physical viewpoint) and is complicated and strongly limited in its application by the need to use, as the initial material, leather fibres which have undergone a tanning process the parameters of which are strictly defined, and are then ground under pH conditions which are likewise strictly defined. In this respect, small variations either in pretanning or in the grinding conditions can make the leather fibres incapable of penetrating the synthetic fibre felt. This latter must in its turn be prepared under conditions which are also limiting (non-hydrophilic fibres, defined structure density etc.).

The problem of making the ground leather fibres penetrate the synthetic felt is evident, in all its difficulty, from German Pat. No. 1,930,523 or from French Pat. No. 2,040,211, which attempt to obviate the aforementioned limiting conditions by spreading the ground leather paste on to textile or non-woven fabric supports, and making the ground leather fibres mechanically penetrate and become bound to the synthetic fibres by needle action on the wetted material. However this system generates considerable equipment problems, as the operation has to be carried out under moist conditions on needling machines designed and constructed to operate under dry conditions, and special stainless steel sawtooth needles have to be used for this purpose, which amongst other things are relatively fragile.

A process has also been proposed, namely that described in French Pat. No. 2,105,639, in which leather or possibly natural collagenic substance is dissolved in more or less concentrated sulphuric acid, and the solution is mixed with other strongly acid solutions of nylon or another high polymer dissolved in concentrated hydrochloric acid. This polyamide-collagenic solution is then applied to a cotton support. However, this type of process has the disadvantage that the extremely acid solution degrades both the material forming the support and the leather fibres, so as to result in a material of modest physical characteristics. In this respect, the action of these acids is so violent that the protein fibres give a precipitate which, after drying, assumes a dry and fragile or corneous physical structure, of no real practical use.

SUMMARY OF THE INVENTION

The object of the present invention is to provide a process for manufacturing artificial leather which allows the disadvantages of the aforementioned processes to be overcome, by giving an artificial leather of excellent structural and mechanical characteristics, the articles manufactured from which have excellent softness, transpirability, and comfort in use, by means of considerable simplification of the individual stages of the process itself and a consequent evident reduction both in equipment and in production costs.

The process according to the present invention substantially comprises at least the following stages:

(a) preparing a colloidal solution of a protein substance of collagenic origin by dissolving untanned tannery flesh and/or slaughterhouse waste (previously depilated or neutralised if necessary) in hot water;

(b) deeply soaking a commercially available synthetic support of good porosity with said solution of collagenic substance and condensing and cross-linking said collagenic substance on the synthetic support fibres by the simple action of cross-linking agents;

(c) tanning the synthetic support thus prepared using the known tanning processes of natural hide tanning technology.

Further characteristics and advantages of the process according to the present invention, and its fundamental differences relative to processes of the known art, will be evident from the detailed decription given hereinafter.

As stated, to prepare the collagenic solution (stage a) of the process) use is made not of leather offcuts or already tanned material in general, as in the known art, but of raw hide scraps, flesh or even slaughterhouse waste. This gives on the one hand the advantage of not being tied to any specific limiting condition with regard to pretanning or grinding, or to dissolving processes carried out under such drastic conditions and in such an acid environment as to require the use of special equipment and very resistant supports, and on the other hand gives the advantage that the quantity of waste material available for use from a slaughtered animal is much greater than the quantity of scrap originating exclusively from the tannery.

In choosing the support for soaking with the solution of collagenic substance, any readily available textile, non-woven fabric, felt or other support may be considered provided it is of sufficient porosity. In this respect, according to the invention, there is no need, as in the case of the known art, to ensure the penetration of a material reduced to distinct fibres of definite dimensions which, although small, are normally "filtered" by the support and retained on its surface, thus implying the need to use either supports of special structure or complicated penetration methods. In contrast, soaking is very rapid and simple thanks to the "solution" state of the collagenic substance and may for example be carried out also by simple direct immersion of the support into the solution.

Thus in choosing the support, the only fundamental characteristics which it need possess are sufficient porosity and resistance to the chemical products used in the final tanning operations. For example, the support should not contain cellulose fibres if the subsequent tanning takes place in an acid environment with mineral acid.

In addition to the aforesaid facility of penetration into the support, the protein solution according to the present invention also has a great facility for cross-linking.

According to the present invention, condensation and cross-linkage of the protein substance on the synthetic support are easily obtained by the action of cross-linking agents. The agents which may be used include for example a solution containing 20 to 30% of a ME(II) sulphate or chloride and 10 to 20% of a ME(I) sulphate or chloride, in which ME(II) may be Mg, and ME(I) may be Na. Alternatively, other agents may be used which can simultaneously provide a pretanning action, such as the synthetic tanning agents known commercially by the general name of "syntans".

A very important fact is that this condensation or coagulation and the cross-linking of the protein substance are in themselves entirely sufficient to ensure adhesion or bonding of the protein particles to the synthetic fibres of the support. Consequently, in contrast to the known art, it is no longer necessary to use other synthetic binders or glues for this purpose.

These facts, which constitute a very important and original characteristic of the process according to the invention, will be more evident from the considerations given hereinafter.

The dermic substance, i.e. that part of the animal hide used for manufacturing the leather, consists essentially of a protein known as collagen.

Collagen originates from a combination of more simple molecules, namely the aminoacids, of general formula:

H₂N—CHR—COOH which condense with elimination of water as follows:

H₂N—CHR—COOH  HHN—CHR—COOH ⟶

H₂N—CHR—CO—NH—CHR—COOH

The —NH₂ and —COOH groups (dissociated at the isoelectric point in the ions —NH₃⊕ and —COO⊖) and the ketoimido group —CO—NH— are the protein groups concerned in tanning, i.e. in the fixation of the tanning agents.

However the ketoimido group has a special and very important function. As it is able to assume an enolic structure

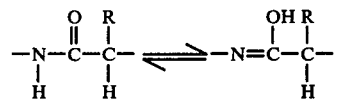

by resonance, the ketoimido group generates bonding forces between adjacent molecules by forming hydrogen bridges, to produce a structure of the following type:

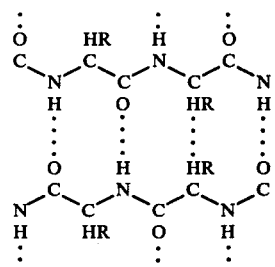

These bonding forces are responsible for the solidity of the structure in the animal hide. In this respect, it has been shown that by eliminating these hydrogen bridges by means of neutral salts such as CaCl₂, the shrinkage temperature of the hide in water is reduced from 60° C. to 20° C., this shrinkage temperature being a measurement of the structural stability of collagen expressed in terms of temperature (G. D. McLaughlin).

This explains why self- cross-linking is possible by the action of the cross-linking agents indicated heretofore, without the aid of external binders.

In this respect, raising the temperature by dissolving the collagen in hot water, as provided by the process according to the invention, eliminates the hydrogen bridges and frees the protein molecules. These then recondense and cross-link when the hydrogen bridges become reconstituted, either directly through agents which reduce solubility, or by using agents (syntans) which consist of molecules with a long chain of conjugate double bonds

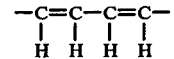

and thus possess the property of forming bridges or rigid coordinated bonds with the ketoimido groups of adjacent protein molecules by the polarisation generated by the electron cloud (of unsaturation) made mobile on the chain by the simultaneous presence in their molecule of dissociated phenolic groups

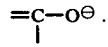

This phenomenon cannot take place if the collagenic fibres are already tanned or pretanned as in the whole of the known art. For this reason, they require external synthetic binders to connect them together and to the synthetic fibres of the support.

These latter however have a negative effect because they block the reactive groups of the protein, which instead have to remain free as they are very important in the mechanism of water fixing. The capacity for fixing water, the intensity of which is a special characteristic of the protein molecule which alone possesses these groups in such a large quantity, is responsible for the characteristics of comfort present in the articles manufactured from products of a protein nature.

In the publication "Protein fibres and the warmth of textiles" published by Butterworths Scientific Publications, London, the author, Wormell, states the following with regard to the special comfort of articles manufactured from yarn of animal origin and therefore of a protein nature:

"Protein fibres notably present a warmer and softer feeling than that presented by cellulose or synthetic fibres . . . In the light of the corpuscular theory, the warmth and high absorption of moisture of protein fibres may be considered due to the rapid equilibrium which occurs between the moisture in the corpuscles and the moisture in the air between the corpuscles. The total surface area of all the corpuscles is very large, and this leads to rapid permeation. We have seen that the surface of the corpuscles is polar, and this aids rapid dispersion of each drop of water which invades the interstices. The acid and basic centres combine chemically with the water and become hydrated, such that a protein fibre may retain up to 30% of moisture without appearing wetted. The absorption of water vapour is accompanied by the development of heat. The polar groups not only effectively disperse moisture, but generate heat in the process".

The comfort properties characteristic of textile fibres of animal origin are also observed with articles of real leather, which is also of protein nature, and cannot be offered by synthetic materials because of the lack in their structure of such numerous active groups.

It is immediately important to note that the chemical reaction with water is a phenomenon which obviously concerns only the surface of the protein micella, because if it concerned the entire structure, it would degrade the structure by hydrolysis.

On the basis of the aforesaid considerations, two fundamental reasons are immediately apparent why the characteristics of artificial leather obtained by known processes are still far removed from those of natural leather, namely:

firstly, in spite of all improvements, the known art has still not proposed a really valid method for ensuring sufficiently abundant and widespread penetration of the synthetic support (fabric or felt) by the collagenic fibres;

secondly, these collagenic fibres are fixed on to the synthetic fibres of the support in the known art, at least up to the present time, by applying synthetic binders which notably form a film covering the micella surface of nearly all the protein fibres which have penetrated the support, so impeding their capacity to undergo the aforementioned reactions.

From these same considerations, it is also evident that the process according to the present invention allows an artificial leather to be manufactured which is very similar to natural leather, because of the easy penetration of the protein substance in solution into the synthetic support and the efficient condensation and cross-linking of this protein substance on the synthetic fibres of the support. In this respect, the inner surface of the artificial leather which is able to react with moisture is almost entirely of protein nature as the protein particles have covered almost the entire surface of the synthetic fibres of the support.

Consequently the artificial leather according to the present invention has excellent comfort characteristics such as have never been obtained up to the present time (and which, under certain aspects and from tests carried out, are in fact superior to those of natural leather), together with excellent mechanical characteristics of stress and wear resistance.

The diffusibility of the protein substance and its neutrality allow semi-finished supports to be treated, and this is a further important advantage. In this respect, the process according to the invention may also be applied to a synthetic non-woven fabric, one face of which has already been coated with a porous synthetic film, such as microporous coagulated polyurethane, which is commercially available, or may also be applied to a fabric coated on both sides with microporous polyurethane and ground. In both cases, the semi-finished support is soaked with the protein solution according to the invention without problems to give the internal free protein surface which is the substantial purpose of the present invention.

The table given hereinafter shows how the characteristics of a commercially available support are substantially modified, the support being a semi-finished support, for example of the type known generally as "poromeric", which is also sold as a "simulated hide":

|  | Before treatment | After treatment |
| --- | --- | --- |
| weight - grams/m$^2$ | 472 | 628 |
| permeability to liquids (Jalade method) | 1 minute 45 seconds | 8 minutes |
| absorption of H$_2$O after 1 minute | 5,5% | 35,6% |
| absorption of H$_2$O after 30 minutes | 21,8% | 50,0% |

The table shows that:

after treatment the support increases in weight by more than 30%, this increase being exclusively due to the protein substance adhering to the synthetic fibres of the support permeability to liquids has substantially decreased on the side corresponding to the leather exterior, i.e. on the side which in an article, for example a shoe, faces outwards. Thus a shoe manufactured with the product according to the invention is much more resistant to water penetration from outside.

H$_2$O absorption, both after one minute and after thirty minutes is in contrast superior. This indicates the capacity of the product according to the invention to easily absorb moisture from the human skin, or perspiration, this effect as stated being of fundamental importance for the comfort of an article, such as a shoe, which remains the entire day in contact with the human body.

One complete example of the practical application of the process according to the invention is given hereinafter, but is susceptible to considerable modification, especially with regard to the final tanning stage, which may be adapted, as can the tanning of natural hides, case for case according to the requirements of the final product:

100 kg. of limed tannery flesh from splitting are washed in a tanning vat for thirty minutes under running water, then delimed with 1% of diluted HCl for thirty minutes, then neutralised with 1% NaHSO$_3$ for thirty minutes and finally again washed in running water for thirty minutes;

the material is then transferred to a double bottom boiler containing 100 litres of water, where it is heated until more or less completely dissolved;

the solution is concentrated under vacuum to a dry material concentration of 30%;

synthetic support sheets are placed in a tanning vat, the capacity for water absorption of the quantity by weight used having previously been determined (e.g. this absorption could be 200% of the weight of the material), and while the vat is rotating, the protein solution obtained as described heretofore and at a temperature of about 70° C. is fed through its hollow shaft, in a quantity equal to the quantity of water absorbable. After rotating sufficiently to allow total soaking of the solution into the support (e.g. after fifteen to thirty minutes), an equivalent quantity of a cross-linking agent, for example an aqueous solution containing 20% of magnesium sulphate and 10% of sodium sulphate, is fed through the hollow shaft of the vat, and rotation is continued for fifteen minutes;

with the vat continuously rotating, and using the normal devices of tanning vats, running water is fed for washing until the excess of agent has disappeared (possibly checking with the normal reagents of chemical analysis, such as $AgNO_3$, $BaCl_2$ etc.);

a 10% aqueous solution of basic chromium sulphate $(Cr_2(OH)_2(H_2O)_6 SO_4)^{++}$ at a basicity of 33° Schorlemmer is now fed into the vat in a quantity sufficient to give more than 7% of $Cr_2O_3$ on the weight of dry material, and rotation is continued for sixty minutes;

on terminating rotation, the vat is washed in running water to remove excess chromium, and it is then deacidified to a pH of 5,5 with $NaHCO_3$ for thirty minutes, after which it is again washed in running water for thirty minutes.

At this point the material may be extracted and dried in normal hide driers. However, before drying, it is possible if required to carry out the known operations of natural hide processing technology, such as dyeing, retanning and/or greasing, which may be conducted in the usual manner and without any special measures.

It can be easily seen on reading the example of application given heretofore that one of the considerable merits of the process heretofore described is that it may be carried out, if required, using usual equipment such as conventional tanning vats. This allows a wide choice of processing details, without the need for rigid production arrangements.

In the example given heretofore, the stages of the process as carried out are:
dissolving the collagenic substance,
soaking the support,
condensing and cross-linking by adding cross-linking agents,
tanning, however it has been found possible, and in certain cases advantageous, to add the cross-linking agents directly to the solution of collagenic substance, and then soak the support with this mixture. In this case, care must be taken to momentarily block the action of the cross-linking agent, for example by keeping its pH value sufficiently high, so that condensation cannot take place before the support is completely soaked.

When soaking is complete, and while the support is still in the soaking bath, the pH value is lowered, for example by adding $Al_2(SO_4)_3$ to allow rapid condensation and cross-linking.

The invention is not limited to the details given heretofore, but is open to various modifications of procedure, all available to an expert of the art and all falling within the scope of protection of the present invention. In particular, the process according to the invention makes it possible to obtain a product having physical characteristics extremely close to those of natural hides, and thus almost all known techniques of processing natural hides may be applied to this product and to the process according to the invention, by simple transposition. Thus for example the product may be obtained with a greater or lesser degree of softness according to requirements, by simply varying the means of drying (pasting, vacuum, oven etc.), thus easily obtaining different types. It also possesses high sensitivity to treatment with the retanning agents used in the tanning of natural hides, and as in the case of these latter easily assumes the scheduled characteristics requested by the user of the finished product.

I claim:

1. A process for manufacturing artificial leather from animal waste, comprising the following steps;
   (a) preparing a colloidal solution of a protein substance of collagenic origin by water solvating limed, but neutralised, untanned tannery flesh, slaughterhouse waste or mixtures thereof in hot water;
   (b) deeply soaking a synthetic support of good porosity, and of known type, with said solution of collagenic substance, and condensing and cross-linking said collagenic substance on the synthetic support fibres by the simple action of cross-linking agents; and
   (c) tanning the support thus soaked by using the known tanning processes of natural hide tanning technology.

2. A process as claimed in claim 1, wherein the collagenic solution is concentrated prior to soaking of the synthetic support.

3. A process as claimed in claim 2, wherein the concentration is continued until the dry matter content lies between 10 and 30%.

4. A process as claimed in claim 1, wherein the quantity of solution used for soaking the synthetic support does not exceed the support's capacity for absorption.

5. A process as claimed in claim 1, wherein the synthetic support is soaked firstly in the collagenic solution and then in the cross-linking agent.

6. A process as claimed in claim 1, wherein the collagenic solution is firstly mixed with a deactivated cross-linking agent, and said mixture is then used for soaking the synthetic support, the condensation and cross-linking of the collagenic substance on the synthetic support fibres being obtained by subsequently activating the cross-linking agent.

7. A process as claimed in claim 6, wherein the deactivation and activation of the cross-linking agent are obtained respectively by varying the pH.

8. A process as claimed in claim 1, wherein said synthetic support consists of a non-woven fabric.

9. A process as claimed in claim 1, wherein said synthetic support consists of a non-woven fabric previously impregnated with synthetic rubber latex and of good porosity.

10. A process as claimed in claim 1, wherein said synthetic support consists of a non-woven fabric previously impregnated with microporous polyurethane.

11. A process as claimed in claim 1, wherein said synthetic support consists of a fabric previously impregnated with microporous polyurethane.

12. A process as claimed in claim 9, wherein said synthetic support is also previously coated with microporous polyurethane on at least one of its faces.

* * * * *

UNITED STATES PATENT AND TRADEMARK OFFICE
CERTIFICATE OF CORRECTION

PATENT NO. : 4,202,919
DATED : May 13, 1980
INVENTOR(S) : Margherita Cavallo

It is certified that error appears in the above—identified patent and that said Letters Patent are hereby corrected as shown below:

In the formula at column 4, lines 17 through 27, counting the columns of the formula from the left, at column 6 please remove the doats "...." between "HR" and "HR" at lines 21 and 23, thus leaving blank the consisting line 22 at column 6.   See below.

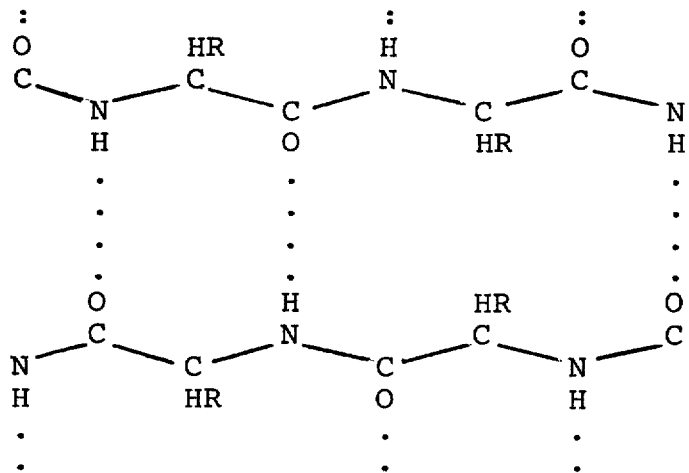

Signed and Sealed this

Ninth  Day of September 1980

[SEAL]

Attest:

SIDNEY A. DIAMOND

Attesting Officer   Commissioner of Patents and Trademark